(12) United States Patent
Malhotra et al.

(10) Patent No.: US 12,399,300 B2
(45) Date of Patent: *Aug. 26, 2025

(54) OSC METASURFACES

(71) Applicant: Meta Platforms Technologies, LLC, Menlo Park, CA (US)

(72) Inventors: Tanya Malhotra, Houston, TX (US); Lafe Joseph Purvis, II, Redmond, WA (US); Ehsan Vadiee, Bothell, WA (US); Tingling Rao, Bellevue, WA (US); Arman Boromand, Issaquah, WA (US); Renate Eva Klementine Landig, Kirkland, WA (US); Andrew John Ouderkirk, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 18/158,653

(22) Filed: Jan. 24, 2023

(65) Prior Publication Data

US 2023/0393305 A1 Dec. 7, 2023

Related U.S. Application Data

(60) Provisional application No. 63/348,740, filed on Jun. 3, 2022.

(51) Int. Cl.
*G02B 1/00* (2006.01)
*B82Y 20/00* (2011.01)
*G02B 6/124* (2006.01)
*G02B 27/01* (2006.01)

(52) U.S. Cl.
CPC .............. *G02B 1/002* (2013.01); *B82Y 20/00* (2013.01); *G02B 6/124* (2013.01); *G02B 27/0172* (2013.01); *G02B 2027/0178* (2013.01)

(58) Field of Classification Search
CPC .... G02B 1/002; G02B 6/124; G02B 27/0172; B82Y 20/00
See application file for complete search history.

(56) References Cited

U.S. PATENT DOCUMENTS

| | | | |
|---|---|---|---|
| 11,340,386 B1* | 5/2022 | Ouderkirk | C23C 16/48 |
| 2017/0315270 A1* | 11/2017 | Yasuda | G02B 1/002 |
| 2019/0154877 A1 | 5/2019 | Capasso et al. | |
| 2021/0063622 A1* | 3/2021 | Nielson | G02B 1/002 |
| 2021/0341658 A1* | 11/2021 | Kim | H10F 39/806 |
| 2022/0035075 A1* | 2/2022 | Rao | G02B 1/02 |
| 2022/0146079 A1* | 5/2022 | Tamma | F21V 14/06 |
| 2022/0146711 A1* | 5/2022 | Greco | G02B 1/002 |
| 2022/0214219 A1* | 7/2022 | Faraon | G01J 3/0229 |
| 2022/0381950 A1* | 12/2022 | Alù | G02B 5/3033 |
| 2022/0404525 A1* | 12/2022 | Wolk | G02B 1/002 |

OTHER PUBLICATIONS

Office Action mailed May 15, 2025 for European Application No. 23177006.6, filed Jun. 2, 2023, 4 pages.

* cited by examiner

*Primary Examiner* — Tina Wong
(74) *Attorney, Agent, or Firm* — Greenberg Traurig, LLP (57) ABSTRACT

An optical element includes a substrate and a metasurface located over a surface of the substrate. The metasurface may include an organic solid crystal material. A related display includes a waveguide, and a light input coupling element disposed on a surface of the waveguide, where the light input coupling element includes an organic solid crystal metasurface.

12 Claims, 5 Drawing Sheets

OSC METASURFACES

CROSS-REFERENCE TO RELATED APPLICATION

This application claims the benefit of priority under 35 U.S.C. § 119(e) of U.S. Provisional Application No. 63/348,740, filed Jun. 3, 2022, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Metasurfaces include engineered nanostructures having sub-wavelength dimensions. A "metasurface" may include structured or unstructured subwavelength-scale features disposed on a supporting substrate or within a supporting matrix. Metasurfaces may include multi-resonance or gap-surface plasmon (GSP) structures, Pancharatnam-Berry phase metasurfaces, and Huygens' metasurfaces. A metasurface may include hyperbolic metamaterials (HMMs), for example. According to particular embodiments, a metasurface includes features manufactured from an organic solid crystal. Features located on the metasurface may include a plurality of spaced apart protrusions.

The composition, design, and configuration of the constituent nanoscale features (i.e., metaatoms), optionally in conjunction with one or more functional materials, may be used to impart customized phase, amplitude, directionality, and/or far field profile to incident light, and may be extended to include polarization conversion and wavefront shaping, for example. Additionally, metasurfaces can be lithographically mass-produced, enabling miniature and multifunctional metasurface optical elements. Metasurfaces formed from a birefringent organic solid crystal may be configured to create a desired polarization response, for example. Various embodiments thus relate to the design of metasurfaces for the efficient manipulation of incident light.

A system may include a source configured to emit light and a metasurface located proximate to a light emitting surface of the source, where the metasurface is configured to modify at least one property of the emitted light. Such a system may be incorporated into a head-mounted display.

By way of example, and in accordance with various embodiments, an integrated metasurface may condense the far field profile of a source of partially spatially or temporally coherent light and accordingly improve the coupling or collection efficiency of emitted light into an optical element such as a lens or a waveguide. In this regard, it is known that the far field profile of light emitted from a source having a smaller output area may be more diffuse than light emitted from a larger source. Applicants have shown that an integrated metasurface may improve the collection optics of a partially spatially or temporally coherent source, and in particular a source that may be characterized by a lateral dimension of less than approximately 50 micrometers, e.g., less than 50, 40, 30, 20, or 10 micrometers, including ranges between any of the foregoing values. In some examples, a metasurface may be incorporated into or form an input or output grating for a waveguide combiner.

Example sources may include one or more multi-mode lasers, one or more vertical cavity surface emitting lasers (VCSELs), or one or more light emitting diodes (LEDs), including regular or irregular arrays thereof. A further example light source may include an organic light emitting diode (OLED).

In some systems, the source may have a compact light emitting surface. Particular examples include an LED source having a light emitting surface characterized by a lateral dimension of less than approximately 50 micrometers, and an OLED source having a light emitting surface characterized by a lateral dimension of less than approximately 200 micrometers. Further examples include a VCSEL source having a light emitting surface characterized by a lateral dimension of less than approximately 50 micrometers. In some embodiments, each addressable element (i.e., pixel) within a display device may have a corresponding metasurface. The source may emit light within the visible spectrum, and the emitted light may be continuous or pulsed. As used herein, the terms "source" or "light source" and "emitter" may be used interchangeably.

The metasurface may include one or more surfaces. In particular embodiments, the metasurface may include a multiplexed 2D array of coherent metasurfaces. As used herein, and in accordance with some examples, a "coherent metasurface" may be configured to transform an incident waveform (e.g., red light) into a desired waveform (e.g., blue light) by spatially varying scattering along the surface. In further embodiments, the metasurface may include a multilayer, i.e., 3D architecture. For instance, a system may include a plurality of coherent metasurfaces, where each coherent metasurface is configured to modify a property of a selected mode of emitted light.

A metasurface may include various classes or organic solid crystal materials, and may be passive or active. A metasurface may include an organic solid crystal (OSC), i.e., OSC material-based metaatoms. An active metasurface may be dynamically reconfigurable through the application of a current, voltage, temperature, or mechanical force. A metasurface may be located in close proximity to the light emitting surface of a source. In some systems, a distance between the light emitting surface and the metasurface may be less than approximately 20λ, where λ is the wavelength of the incident light. In particular embodiments, a distance between the light emitting surface and the metasurface may be less than approximately 10 micrometers.

According to further embodiments, a method may include emitting partially spatially or temporally coherent light from a source, and passing the emitted light through a metasurface located proximate to the source, such that the metasurface modifies at least one property of the emitted light.

Organic solid crystal thin films may be incorporated into a metasurface as a single layer or multilayer architecture. A multilayer thin film that includes plural layers of an organic solid crystal material may include a plurality of biaxially oriented organic solid material layers. Each biaxial layer may be characterized by three mutually orthogonal refractive indices ($n_1$, $n_2$, $n_3$) where $n_1 \neq n_2 \neq n_3$.

According to particular embodiments, a multilayer organic solid thin film may be incorporated into a light source such as an OLED to improve light extraction efficiency. By aligning (i.e., rotating) each layer in plane with respect to an adjacent layer, such biaxially oriented multilayer thin films may enable higher signal efficiency and greater ghost image suppression than architectures using comparative materials. Organic solid thin films can also be used in various projectors as a brightness enhancement layer.

One or more source materials may be used to form an organic solid thin film, including a multilayer thin film. Example organic materials may include various classes of crystallizable organic semiconductors. In accordance with various embodiments, organic semiconductors may include small molecules, macromolecules, liquid crystals, organometallic compounds, oligomers, and polymers. Organic semiconductors may include p-type, n-type, or ambipolar polycyclic aromatic hydrocarbons, such as such as benzene, naphthalene, anthracene, tetracene, pentacene, 2,6-naphthalene dicarboxylic acid, and 2,6-dimethyl carboxylic esters. Example compounds may include cyclic, linear and/or branched structures, which may be saturated or unsaturated, and may additionally include heteroatoms and/or saturated or unsaturated heterocycles, such as furan, pyrrole, thiophene, pyridine, pyrimidine, piperidine, and the like. Heteroatoms may include nitrogen, sulfur, oxygen, phosphorus, selenium, tellurium, fluorine, chlorine, bromine or iodine.

Compounds can be chelated to metals, such as copper phthalocyanine. Crystals can also be doped with other materials including metals, iodine, and other organic semiconductors. Suitable feedstock for molding solid organic semiconductor materials may include neat organic compositions, melts, solutions, or suspensions containing one or more of the organic materials disclosed herein.

Structurally, the disclosed organic materials, as well as the thin films derived therefrom, may be single crystal, polycrystalline, or glassy. Organic solid crystals may include closely packed structures (e.g., organic molecules) that exhibit desirable optical properties such as a high and tunable refractive index, and high birefringence. Anisotropic organic solid materials may include a preferred packing of molecules or a preferred orientation or alignment of molecules.

Such organic solid crystal (OSC) materials may provide functionalities, including phase modulation, beam steering, wave-front shaping and correction, optical communication, optical computation, holography, and the like. Due to their optical and mechanical properties, organic solid crystals may enable high-performance devices, and may be incorporated into passive or active optics, including AR/VR headsets, and may replace comparative material systems such as polymers, inorganic materials, and liquid crystals. In certain aspects, organic solid crystals may have optical properties that rival those of inorganic crystals while exhibiting the processability and electrical response of liquid crystals.

Due to their relatively low melting temperature, organic solid crystal materials may be molded to form a desired structure. Molding processes may enable complex architectures and may be more economical than the cutting, grinding, and polishing of bulk crystals. In one example, a single crystal or polycrystalline shape such as a sheet or cube may be partially or fully melted into a desired form and then controllably cooled to form a single crystal having a new shape.

A process of molding an optically anisotropic crystalline or partially crystalline thin film, for example, may include operational control of the thermodynamics and kinetics of nucleation and crystal growth. In certain embodiments, a temperature during molding proximate to a nucleation region of a mold may be less than a melting onset temperature ($T_m$) of a molding composition, while the temperature remote from the nucleation region may be greater than the melting onset temperature. Such a temperature gradient paradigm may be obtained through a spatially applied thermal gradient, optionally in conjunction with a selective melting process (e.g., laser, soldering iron, etc.) to remove excess nuclei, leaving few nuclei (e.g., a single nucleus) for crystal growth.

To promote nucleation and crystal growth, a selected temperature and temperature gradient may be applied to a crystallization front of a nascent thin film. For instance, the temperature and temperature gradient proximate to the crystallization front may be determined based on the selected feedstock (i.e., molding composition), including its melting temperature, thermal stability, and rheological attributes.

A suitable mold for molding an organic solid thin film may be formed from a material having a softening temperature or a glass transition temperature ($T_g$) greater than the melting onset temperature ($T_m$) of the molding composition. The mold may include any suitable material, e.g., silicon, silicon dioxide, fused silica, quartz, glass, nickel, silicone, siloxanes, perfluoropolyethers, polytetrafluoroethylenes, perfluoroalkoxy alkanes, polyimide, polyethylene naphthalate, polyvinylidene fluoride, polyphenylene sulfide, and the like.

An epitaxial or non-epitaxial growth process may be used to form an organic solid crystal (OSC) layer over a suitable substrate or mold. A seed crystal for encouraging crystal nucleation and an anti-nucleation layer configured to locally inhibit nucleation may collectively promote the formation of a limited number of crystal nuclei within one or more specified location(s), which may in turn encourage the formation of larger, contiguous organic solid crystals. In some embodiments, a nucleation-promoting layer or seed crystal may itself be configured as a thin film.

Example nucleation-promoting or seed materials may include one or more metallic or inorganic elements or compounds, such as Pt, Ag, Au, Al, Pb, indium tin oxide, $SiO_2$, and the like. Further example nucleation-promoting or seed crystal materials may include organic compounds, such as a polyimide, polyamide, polyurethane, polyurea, polythiolurethane, polyethylene, polysulfonate, polyolefin, as well as mixtures and combinations thereof. Further example nucleation-promoting materials include small molecule organic single crystals, such as single crystals of anthracene, pentathiophene, tolane, and the like. In some examples, a nucleation-promoting material may be configured as a textured or aligned layer, such as a rubbed polyimide or photoalignment layer, which may be configured to induce directionality or a preferred orientation to an over-formed organic solid crystal thin film.

An example method for manufacturing an organic solid crystal thin film includes providing a mold, forming a layer of a nucleation-promoting material over at least a portion of a surface of the mold, and depositing a layer of molten feedstock over the surface of the mold and in contact with the layer of the nucleation-promoting material, while maintaining a temperature gradient across the layer of the molten feedstock.

An anti-nucleation layer may include a dielectric material. In further embodiments, an anti-nucleation layer may include an amorphous material. In example processes, crystal nucleation may occur independent of the substrate or mold.

In some embodiments, a surface treatment or release layer disposed over the substrate or mold may be used to control nucleation and growth of the organic solid crystal (OSC) and later promote separation and harvesting of a bulk crystal or thin film. For instance, a coating having a solubility parameter mismatch with the deposition chemistry may be applied to the substrate (e.g., globally or locally) to suppress interaction between the substrate and the crystallizing layer during the deposition process.

Example surface treatment coatings may include oleophobic coatings or hydrophobic coatings. A thin layer, e.g., monolayer or bilayer, of an oleophobic material or a hydrophobic material may be used to condition the substrate or mold prior to an epitaxial process. The coating material may be selected based on the substrate and/or the organic crystalline material. Further example surface treatment coating materials include siloxanes, fluorosiloxanes, phenyl siloxanes, fluorinated coatings, polyvinyl alcohol, and other OH bearing coatings, acrylics, polyurethanes, polyesters, polyimides, and the like.

In some embodiments, a release agent may be applied to an internal surface of the mold and/or combined with the molding composition. A surface treatment of an inner surface of the mold may include the chemical bonding or physical adsorption of small molecules, or polymers/oligomers having linear, branched, dendritic, or ringed structures, that may be functionalized or terminated, for example, with fluorinated groups, silicones, or hydrocarbon groups.

A buffer layer may be formed over the deposition surface of a substrate or mold. A buffer layer may include a small molecule that may be similar to or even equivalent to the small molecule forming the organic solid crystal, e.g., an anthracene single crystal. A buffer layer may be used to tune one or more properties of the deposition/growth surface of the substrate or mold, including surface energy, wettability, crystalline or molecular orientation, etc.

A further example method for manufacturing an organic solid crystal thin film includes forming a layer of a molecular feedstock over a surface of a mold, the molecular feedstock including crystallizable organic molecules, forming a selected number of crystal nuclei from the organic molecules within a nucleation region of the molecular feedstock layer, and growing the selected number of crystal nuclei to form an organic solid crystal thin film. In some embodiments, the selected number of crystal nuclei may be one. Crystal growth may be controlled using an isothermal process, slow cooling, and zone annealing.

In some embodiments, an additive may be used to encourage the growth of a single crystal and/or its release from the mold. In some embodiments, in addition to the precursor (i.e., crystallizable organic molecules) for the organic solid crystal, a molecular feedstock may include an additive selected from polymers, oligomers, and small molecules, where the additive may have a melting onset temperature of at least 20° C. less than a melting onset temperature of the organic solid crystal precursor, e.g., 20° C., 30° C., or even 40° C. less than the melting onset temperature of the molding composition. An additive may promote crystal growth and the formation of a large crystal size. In some embodiments, an additive may be integrated with a molding process to improve the characteristics of a molded organic solid thin film, including its surface roughness.

During the act of molding, and in accordance with particular embodiments, a cover plate may be applied to a free surface of the organic solid crystal thin film. The cover plate may be oriented at an angle with respect to a major surface of the thin film. A force may be applied to the cover plate to generate capillary forces that facilitate mass transport of the molten feedstock, i.e., between the cover plate and the substrate and in the direction of a crystallization front of a growing crystalline thin film. In some embodiments, such as through vertical orientation of the deposition system, the force of gravity may contribute to mass transport and the delivery of the molten feedstock to the crystallization front. Suitable materials for the cover plate and the substrate may independently include silicon dioxide, fused silica, high index glasses, high index inorganic crystals, and high melting temperature polymers (e.g., siloxanes, polyimides, PTFE, PFA, etc.), although further material compositions are contemplated. In particular embodiments, a substrate supporting an OSC metasurface may include an organic solid crystal.

According to particular embodiments, a method of forming an organic solid crystal (OSC) may include contacting an organic precursor (i.e., crystallizable organic molecules) with a non-volatile medium material, forming a layer including the organic precursor over a surface of a substrate or mold, and processing the organic precursor to form an organic crystalline phase, where the organic crystalline phase may include a preferred orientation of molecules.

The act of contacting the organic precursor with the non-volatile medium material may include forming a homogeneous mixture of the organic precursor and the non-volatile medium material. In further embodiments, the act of contacting the organic precursor with the non-volatile medium material may include forming a layer of the non-volatile medium material over a surface of a substrate or mold and forming a layer of the organic precursor over the layer of the non-volatile medium material.

In some embodiments, a non-volatile medium material may be disposed between the mold surface and the organic precursor and may be adapted to decrease the surface roughness of the molded organic thin film and promote its release from the mold while locally inhibiting nucleation of a crystalline phase. Example non-volatile medium materials include liquids such as silicone oil, a fluorinated polymer, a polyolefin and/or polyethylene glycol. Further example non-volatile medium materials may include crystalline materials having a melting temperature that is less than the melting temperature of the organic precursor material. In some embodiments the mold surface may be pre-treated in order to improve wetting and/or adhesion of the non-volatile medium material.

The substrate or mold may include a surface that may be configured to provide a desired shape to the molded organic solid thin film. For example, the substrate or mold surface may be planar, concave, or convex, and may include a three-dimensional architecture, such as surface relief gratings, or a curvature (e.g., compound curvature) configured to form microlenses, microprisms, or prismatic lenses. According to some embodiments, a substrate or mold geometry may be transferred and incorporated into a surface of an over-formed organic solid crystal thin film. For the sake of convenience, the terms "substrate" and "mold" may be used interchangeably herein unless the context indicates otherwise.

The deposition surface of a substrate or mold may include a functional layer that is configured to be transferred to the organic solid crystal after formation of the organic solid crystal and its separation from the substrate or mold. Functional layers may include an interference coating, an AR coating, a reflectivity enhancing coating, a bandpass coating, a band-block coating, blanket or patterned electrodes, etc. By way of example, an electrode may include any suitably electrically conductive material such as a metal, a transparent conductive oxide (TCO) (e.g., indium tin oxide or indium gallium zinc oxide), or a metal mesh or nanowire matrix (e.g., including metal nanowires or carbon nanotubes).

In lieu of, or in addition to, molding, further example deposition methods for forming organic solid crystals include vapor phase growth, solid state growth, melt-based growth, solution growth, etc., optionally in conjunction with a suitable substrate and/or seed crystal. A substrate may be organic or inorganic. By way of example, thin film solid organic materials may be manufactured using one or more processes selected from chemical vapor deposition and physical vapor deposition. Further coating processes, e.g., from solution or a melt, may include 3D printing, ink jet printing, gravure printing, doctor blading, spin coating, and the like. Such processes may induce shear during the act of coating and accordingly may contribute to crystallite or molecular alignment and a preferred orientation of crystallites and/or molecules within an organic solid crystal thin film. A still further example method may include pulling a free-standing crystal from a melt. According to some embodiments, solid-, liquid-, or gas-phase deposition processes may include epitaxial processes.

As used herein, the terms "epitaxy," "epitaxial" and/or "epitaxial growth and/or deposition" refer to the nucleation and growth of an organic solid crystal on a deposition surface where the organic solid crystal layer being grown assumes the same crystalline habit as the material of the deposition surface. For example, in an epitaxial deposition process, chemical reactants may be controlled, and the system parameters may be set so that depositing atoms or molecules alight on the deposition surface and remain sufficiently mobile via surface diffusion to orient themselves according to the crystalline orientation of the atoms or molecules of the deposition surface. An epitaxial process may be homogeneous or heterogeneous.

In accordance with various embodiments, the optical and electrooptical properties of an organic solid crystal thin film may be tuned using doping and related techniques. Doping may influence the polarizability of an organic solid crystal, for example. The introduction of dopants, i.e., impurities, into an organic solid crystal, may influence, for example, the highest occupied molecular orbital (HOMO) and lowest unoccupied molecular orbital (LUMO) bands and hence the band gap thereof, induced dipole moment, and/or molecular/crystal polarizability.

Doping may be performed in situ, i.e., during epitaxial growth, or following epitaxial growth, for example, using ion implantation or plasma doping. In exemplary embodiments, doping may be used to modify the electronic structure of an organic solid crystal without damaging molecular packing or the crystal structure itself. In this vein, a post-implantation annealing step may be used to heal crystal defects introduced during ion implantation or plasma doping. Annealing may include rapid thermal annealing or pulsed annealing, for example.

Doping changes the electron and hole carrier concentrations of a host material at thermal equilibrium. A doped organic solid crystal may be p-type, n-type, or ambipolar. As used herein, "p-type" refers to the addition of impurities to an organic solid crystal that create a deficiency of valence electrons, whereas "n-type" refers to the addition of impurities that contribute free electrons to an organic solid crystal. Without wishing to be bound by theory, doping may influence "π-stacking" and "π-π interactions" within an organic solid crystal.

Example dopants include Lewis acids (electron acceptors) and Lewis bases (electron donors). Particular examples include charge-neutral and ionic species, e.g., Brønsted acids and Brønsted bases, which in conjunction with the aforementioned processes may be incorporated into an organic solid crystal by solution growth or co-deposition from the vapor phase. In particular embodiments, a dopant may include an organic molecule, an organic ion, an inorganic molecule, or an inorganic ion. A doping profile may be homogeneous or localized to a particular region (e.g., depth or area) of an organic solid crystal.

During nucleation and growth, the orientation of the in-plane axes of an OSC thin film may be controlled using one or more of substrate temperature, deposition pressure, solvent vapor pressure, or non-solvent vapor pressure. High refractive index and highly birefringent organic solid thin films may be supported by a substrate or mold or removed therefrom to form a free-standing thin film. A substrate, if used, may be rigid or deformable.

Example processes may be integrated with a real-time feedback loop that is configured to assess one or more attributes of the organic solid crystal and accordingly adjust one or more process variables, including melt temperature, mold temperature, feedstock injection rate into a mold, etc.

Following deposition, an OSC thin film may be diced and polished to achieve a desired form factor and surface quality. Dicing may include diamond turning, for example, although other cutting methods may be used. Polishing may include chemical mechanical polishing. In some embodiments, a chemical or mechanical surface treatment may be used to create structures on a surface of an OSC thin film. Example surface treatment methods include diamond turning and photolithography and etch processes. In some embodiments, a cover plate or substrate with reciprocal structures may be used to fabricate surface structures in an OSC thin film.

An organic thin film may include a surface that is planar, convex, or concave. In some embodiments, the surface may include a three-dimensional architecture, such as a periodic surface relief grating. In further embodiments, a thin film may be configured as a microlens or a prismatic lens. For instance, polarization optics may include a microlens that selectively focuses one polarization of light over another. In some embodiments, a structured surface may be formed in situ, i.e., during crystal growth of the organic solid crystal thin film over a suitably shaped mold. In further embodiments, a structured surface may be formed after crystal growth, e.g., using additive or subtractive processing, such as 3D printing or photolithography and etching. The nucleation and growth kinetics and choice of chemistry may be selected to produce a solid organic crystal thin film having areal (lateral) dimensions of at least approximately 1 cm.

The organic crystalline phase may be single crystal or polycrystalline. In some embodiments, the organic crystalline phase may include amorphous regions. In some embodiments, the organic crystalline phase may be substantially crystalline. The organic crystalline phase may be characterized by a refractive index along at least one principal axis of at least approximately 1.5 at 589 nm. By way of example, the refractive index of the organic crystalline phase at 589 nm and along at least one principal axis may be at least approximately 1.5, at least approximately 1.6, at least approximately 1.7, at least approximately 1.8, at least approximately 1.9, at least approximately 2.0, at least approximately 2.1, at least approximately 2.2, at least approximately 2.3, at least approximately 2.4, at least approximately 2.5, or at least approximately 2.6, including ranges between any of the foregoing values.

In some embodiments, the organic crystalline phase may be characterized by a birefringence ($\Delta n$) (where $n_1 \neq n_2 \neq n_3$, $n_1 \neq n_2 \neq n_3$, or $n_1 \neq n_2 \neq n_3$) of at least approximately 0.01, e.g., at least approximately 0.01, at least approximately 0.02, at least approximately 0.05, at least approximately 0.1, at least approximately 0.2, at least approximately 0.3, at least approximately 0.4, or at least approximately 0.5, including ranges between any of the foregoing values. In some embodiments, a birefringent organic crystalline phase may be characterized by a birefringence of less than approximately 0.01, e.g., less than approximately 0.01, less than approximately less than approximately 0.002, or less than approximately 0.001, including ranges between any of the foregoing values.

Three axis ellipsometry data for example isotropic or anisotropic organic molecules are shown in Table 1. The data include predicted and measured refractive index values and birefringence values for 1,2,3-trichlorobenzene (1,2,3-TCB), 1,2-diphenylethyne (1,2-DPE), and phenazine. Shown are larger than anticipated refractive index values and birefringence compared to calculated values based on the HOMO-LUMO gap for each organic material composition.

TABLE 1

Index and Birefringence Data for Example Organic Semiconductors

| Organic Material | Predicted Index | Measured Index (589 nm) | | | Birefringence | | |
|---|---|---|---|---|---|---|---|
| | | nx | ny | nz | $\Delta n(xy)$ | $\Delta n(xz)$ | $\Delta n(yz)$ |
| 1,2,3-TCB | 1.567 | 1.67 | 1.76 | 1.85 | 0.09 | 0.18 | 0.09 |
| 1,2-DPE | 1.623 | 1.62 | 1.83 | 1.63 | 0.18 | 0.01 | 0.17 |
| phenazine | 1.74 | 1.76 | 1.84 | 1.97 | 0.08 | 0.21 | 0.13 |

Organic solid thin films, including multilayer organic solid thin films, may be optically transparent and exhibit low bulk haze. As used herein, a material or element that is "transparent" or "optically transparent" may, for a given thickness, have a transmissivity within the visible light and/or near-IR spectra of at least approximately 60%, e.g., approximately 60, 65, 70, 75, 80, 90, 95, 97, 98, 99, or 99.5%, including ranges between any of the foregoing values, and less than approximately 5% bulk haze, e.g., approximately 0.1, 0.2, 0.4, 1, 2, or 4% bulk haze, including ranges between any of the foregoing values. Transparent materials will typically exhibit very low optical absorption and minimal optical scattering.

As used herein, the terms "haze" and "clarity" may refer to an optical phenomenon associated with the transmission of light through a material, and may be attributed, for example, to the refraction of light within the material, e.g., due to secondary phases or porosity and/or the reflection of light from one or more surfaces of the material. As will be appreciated, haze may be associated with an amount of light that is subject to wide angle scattering (i.e., at an angle greater than 2.5° from normal) and a corresponding loss of transmissive contrast, whereas clarity may relate to an amount of light that is subject to narrow angle scattering (i.e., at an angle less than 2.5° from normal) and an attendant loss of optical sharpness or "see through quality."

In some embodiments, one or more organic solid thin film layers may be diced and stacked to form a multilayer. A multilayer thin film may be formed by clocking and stacking individual layers. That is, in an example "clocked" multilayer stack, an angle of refractive index misorientation between successive layers may range from approximately 1° to approximately 90°, e.g., 1, 2, 5, 10, 20, 30, 40, 45, 50, 60, 70, 80, or 90°, including ranges between any of the foregoing values.

In example multilayer architectures, the thickness of each layer may be determined from an average value of in-plane refractive indices ($n_2$ and $n_3$), where $(n_2+n_3)/2$ may be greater than approximately 1.5, e.g., greater than 1.5, greater than 1.55, or greater than 1.6. Generally, the thickness of a given layer may be inversely proportional to the arithmetic average of its in-plane indices. In a similar vein, the total number of layers in a multilayer stack may be determined from the in-plane birefringence ($|n_3-n_2|$), which may be greater than approximately 0.01, e.g., greater than 0.01, greater than 0.02, greater than 0.05, greater than 0.1, or greater than 0.2.

In a multilayer architecture, the thickness of each OSC layer may be constant or variable. In some examples, the OSC layer thickness may vary throughout the stack. The OSC layer thickness may vary continuously, for instance, with the thickness increasing for each successive layer throughout the multilayer.

According to some embodiments, for a given biaxially-oriented organic solid material layer within a multilayer stack, the out-of-plane index ($n_1$) may be related to the in-plane refractive indices ($n_2$ and $n_3$) by the relationship $n_1 = \frac{1}{2\pi} \int_0^{2\pi} \sqrt{(n_2\sin\varphi)^2 + (n_3\cos\varphi)^2}\, d\varphi$, where $\varphi$ represents a rotation angle of a refractive index vector between adjacent layers. The variation in $n_1$ may be less than ±0.7, less than ±0.6, less than ±0.5, less than ±0.4, less than ±0.3, or less than ±0.2.

According to some embodiments, a multilayer may include OSC material layers and secondary material layers arranged in an ABAB . . . repeating structure. The secondary material layers may include one or more of an amorphous polymer, amorphous inorganic compound, or liquid crystal.

A multilayer may additionally include paired conductive electrodes that are configured to apply a voltage or current to an OSC material layer located between the electrodes. In some embodiments, the electrodes may be arranged to apply a voltage or current to each OSC layer independently. In some embodiments, the electrodes may be arranged to apply a voltage or current to distinct layer groups within the multilayer. The refractive index or an OSC thin film may be manipulated by an applied voltage, current, or stress.

Disclosed are organic solid crystals and organic solid crystal-based metasurfaces having an actively tunable refractive index and birefringence. Without wishing to be bound by theory, the source of active refractive index modulation in organic solid crystals (OSCs) may be a result of a change in polarizability of molecules that are charged due to hole or electron injection. In organic molecules, the time it takes for a molecule to repolarize upon charge injection may be about an order of magnitude faster than the residence time of the charge. Thus, the charge may be localized on the molecule for a sufficient time to modulate the electron cloud of the molecule and/or neighboring molecules. This change in the local electronics of an OSC may induce a change in the polarizability and refractive index. Methods of manufacturing such organic solid crystals may enable control of their surface roughness independent of surface features (e.g., gratings, etc.) and may include the formation of an optical element therefrom, such as a reflective polarizer.

According to various embodiments, an optical element including an organic solid crystal (OSC) may be integrated into an optical component or device, such as an OFET, OPV, OLED, etc., and may be incorporated into a structure or a device such as a waveguide, Fresnel lens (e.g., a cylindrical Fresnel lens or a spherical Fresnel lens), grating, photonic integrated circuit, birefringent compensation layer, reflective polarizer, index matching layer (LED/OLED), and the like. In certain embodiments, grating architectures may be tunable along one, two, or three dimensions. Optical elements may include a single layer or a multilayer OSC architecture.

As will be appreciated, one or more characteristics of organic solid crystals may be specifically tailored for a particular application. For many optical applications, for instance, it may be advantageous to control crystallite size, surface roughness, mechanical strength and toughness, and the orientation of crystallites and/or molecules within an organic solid crystal thin film. In a multilayer architecture, the composition, structure, and properties of each organic layer may be independently selected.

Organic solid crystals (e.g., OSC thin films) may be incorporated into passive and active optical waveguides, resonators, lasers, optical modulators, etc. Further example active optics include projectors and projection optics, ophthalmic high index lenses, eye-tracking, gradient-index optics, Pancharatnam-Berry phase (PBP) lenses, microlenses, pupil steering elements, optical computing, fiber optics, rewritable optical data storage, all-optical logic gates, multi-wavelength optical data processing, optical transistors, etc. According to further embodiments, organic solid crystals (e.g., OSC thin films) may be incorporated into passive optics, such as waveguides, reflective polarizers, refractive/diffractive lenses, and the like. Related optical elements for passive optics may include waveguides, polarization selective gratings, Fresnel lenses, microlenses, geometric lenses, PBP lenses, and multilayer thin films.

As will be appreciated, the LED-based displays described herein may include microLEDs. Moreover, the LED-based displays may include organic LEDs (OLEDS), including micro-OLEDs. The LED-based displays may be incorporated into a variety of devices, such as wearable near-eye displays (NEDs). The disclosed methods and structures may be used to manufacture low cost, high resolution displays having a commercially-relevant form factor (e.g., having one or more lateral dimensions greater than approximately 1.6 inches).

Features from any of the above-mentioned embodiments may be used in combination with one another according to the general principles described herein. These and other embodiments, features, and advantages will be more fully understood upon reading the following detailed description in conjunction with the accompanying drawings and claims.

The following will provide, with reference to FIGS. 1-9, a detailed description of organic solid crystal (OSC)-containing metasurfaces, related devices and systems, and their methods of manufacture. In accordance with particular embodiments, the discussion associated with FIGS. 1-7 relates to metasurfaces including metaatoms of an organic solid crystal material. The discussion associated with FIGS. 8 and 9 relates to various virtual reality platforms that may include a metasurface as described herein.

Figure 1:
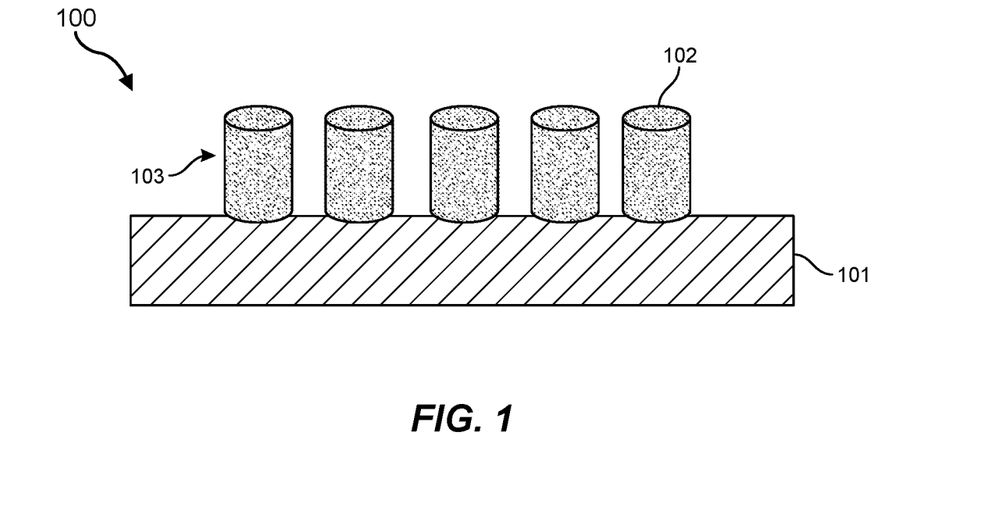
FIG. 1 is a cross-sectional perspective view of an optical element including an organic solid crystal (OSC) metasurface according to some embodiments.

Referring to FIG. 1, a transmissive optical element 100 includes a substrate 101 and a plurality of organic solid crystal (OSC) light scattering features 102 disposed over the substrate 101. In the illustrated embodiment, light scattering features 102 form a metasurface 103. Light scattering features 102 may interact with light incident on the metasurface 103 to modify one or more of an amplitude, phase, or polarization of the light, e.g., across a wavefront of the light. Light scattering features 102 may be characterized as congruent, having equivalent height and lateral dimensions.

Without wishing to be bound by theory, and in accordance with some embodiments, phase modulation of the light, for example, may result from the light scattering features behaving as tiny resonators (i.e., truncated waveguides) where the effective index in the fundamental mode for these resonators may tune the phase response. As the effective index changes, the phase accumulation for each metaatom may also change. Whereas the phase modulation at each spatial location across the optical element is a function of the geometry of the light scattering features (height and lateral dimensions), the phase of the incident light may be tuned across the metasurface by changing the fill-fraction and overall architecture of the metaatoms.

Figure 2:
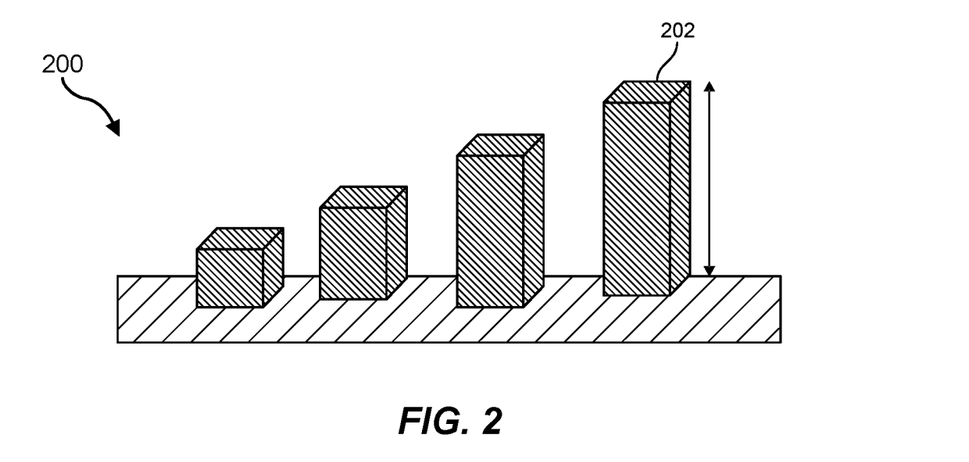
FIG. 2 is a cross-sectional perspective view of an optical element including an organic solid crystal (OSC) metasurface with light scattering features having different heights according to some embodiments.
Figure 3:
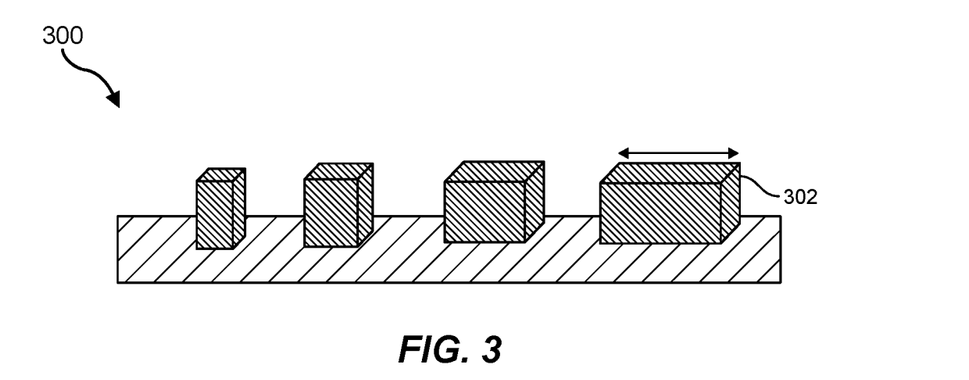
FIG. 3 is a cross-sectional perspective view of an optical element including an organic solid crystal (OSC) metasurface with light scattering features having different lateral dimensions according to some embodiments.

Referring to FIG. 2, shown is an example optical element 200 with light scattering features 202 having a variable height dimension. Referring to FIG. 3, shown is an example optical element 300 having light scattering features 302 having a variable lateral dimension. By varying the dimensions of the light scattering features, spatial phase variations in the EM field may be tuned locally. That is, by physically changing the dimensions of the light scattering features, different phase delays may be obtained at different locations across the metasurface. This may enable the formation of different optical elements, such as a light deflector or lens.

Figure 4:
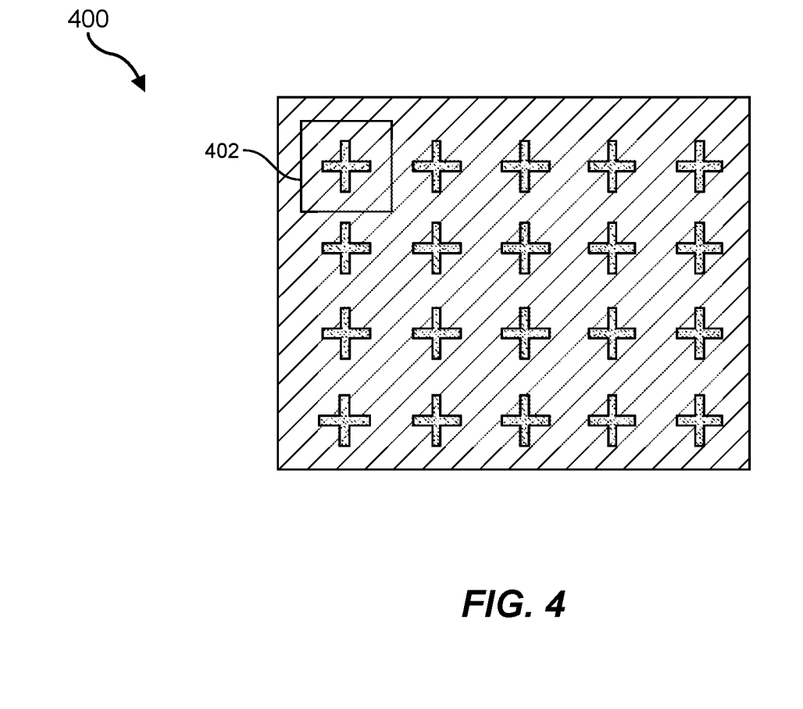
FIG. 4 is a top-down plan view of an optical element including a regular array of equivalent OSC-based light scattering features according to certain embodiments.
Figure 5:
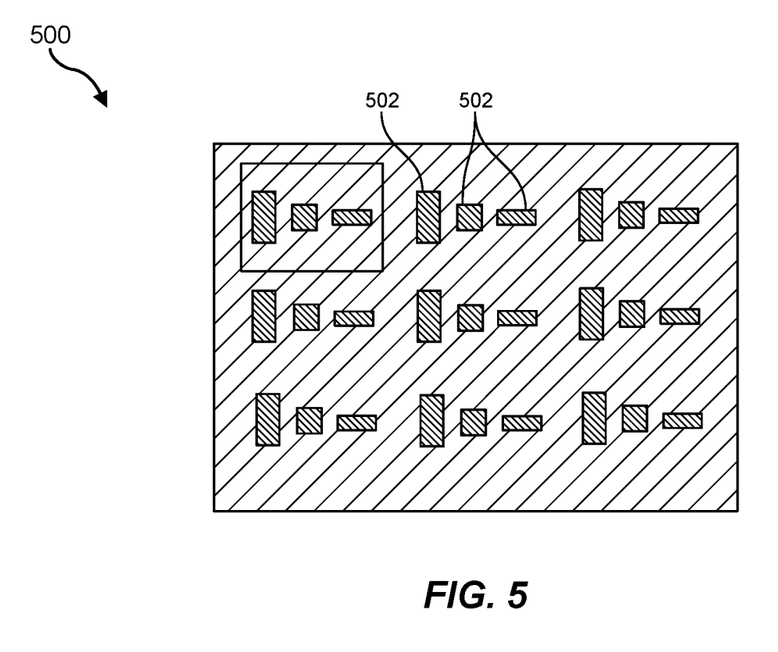
FIG. 5 is a top-down plan view of an optical element including a regular array of geometrically diverse light scattering features according to certain embodiments.

Turning to FIG. 4, shown is a top-down plan view of an optical element 400 having an array of equivalent light scattering features 402. Referring to FIG. 5, shown is a top-down plan view of an optical element 500. Optical element 500 includes an array of geometrically (or compositionally) diverse light scattering features 502.

Figure 6:
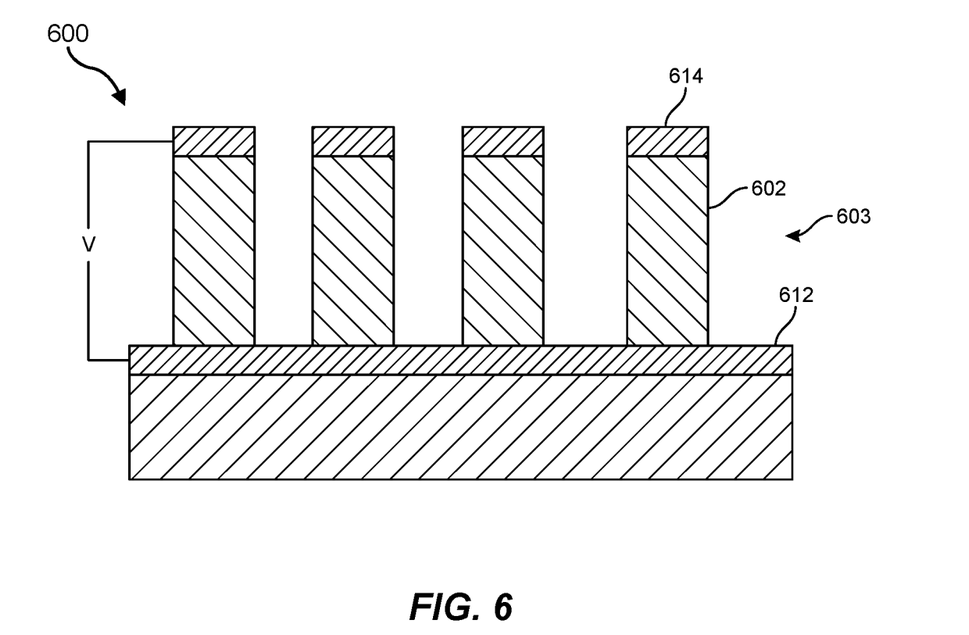
FIG. 6 is a cross-sectional view of an active optical element including an electroded metasurface according to various embodiments.

Referring to FIG. 6, optical element 600 includes plural OSC light scattering features 602 that form a metasurface 603. The light scattering features 602 are disposed between electrodes 612, 614. The refractive index of the OSC light scattering features 602 may be tuned through the application of a current or voltage to create a desired interaction with incident light, which may be used to form, for example, an active optical grating or an active lens.

Figure 7:
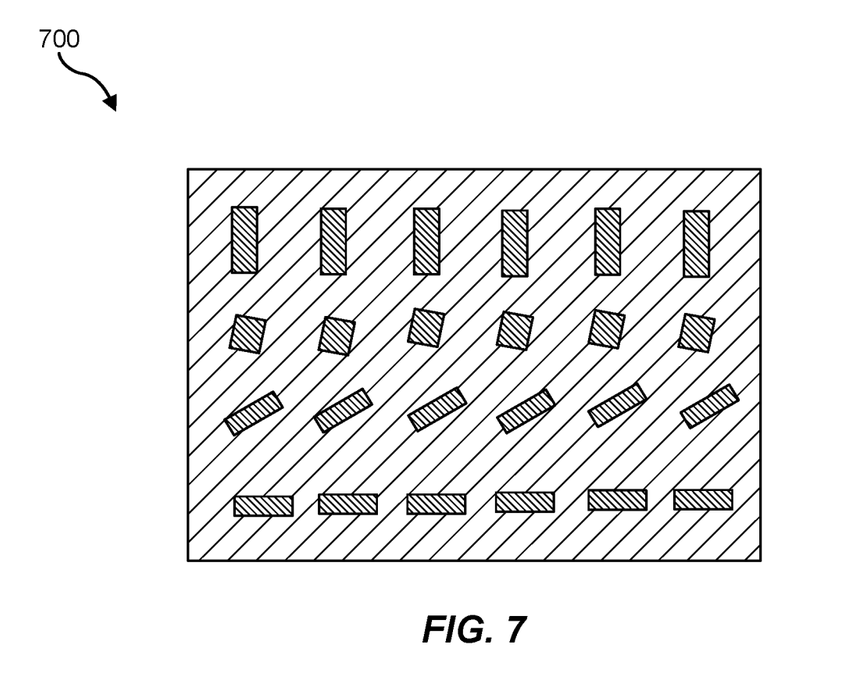
FIG. 7 is a top-down plan view of an optical element including an array of rotationally offset light scattering features according to certain embodiments.

Referring to FIG. 7, shown is a top-down plan view of an optical element 700 that includes a plurality of rotationally offset metaatoms. Such a structure may be configured to tune a polarization response of the optical element, for example. According to some embodiments, a birefringent OSC material may enhance the polarization response and improve the efficiency of optical element 700.

An optical element includes a substrate and a metasurface located over a surface of the substrate. In accordance with particular embodiments, the metasurface includes a plurality of light scattering features (e.g., metaatoms), which may include an organic solid crystal. The metasurface may be passive or active, and may be configured to modify one or more of an amplitude, phase, or polarization of incident light. The geometry or composition of the light scattering features may be configured to tune the phase delay of the metasurface.

EXAMPLE EMBODIMENTS

Example 1: An optical element includes a substrate and a metasurface located over a surface of the substrate, where the metasurface includes an organic solid crystal.

Example 2: The optical element of Example 1, where the substrate includes an organic solid crystal.

Example 3: The optical element of any of Examples 1 and 2, where the organic solid crystal includes a moiety selected from saturated or unsaturated polycyclic hydrocarbons, benzene, naphthalene, anthracene, tetracene, pentacene, 2,6-naphthalene dicarboxylic acid, and 2,6-dimethyl carboxylic esters.

Example 4: The optical element of any of Examples 1-3, where the metasurface includes features having a height dimension between approximately 1 nm and 1000 nm.

Example 5: The optical element of any of Examples 1-4, where the metasurface includes features having a cross-sectional shape selected from square, rectangular, circular, oval, and asymmetric, and the cross-sectional shape has a lateral dimension between approximately 1 nm and 500 nm.

Example 6: The optical element of any of Examples 1-5, where the metasurface includes features having a different shape and size.

Example 7: The optical element of any of Examples 1-6, where the metasurface is configured to interact with incident light and modify at least one of an amplitude, phase, or polarization of the light.

Example 8: The optical element of any of Examples 1-7, where the metasurface includes a 1D, 2D, or 3D array of geometrically equivalent features arranged at a pitch of between approximately 10 nm and 1000 nm.

Example 9: The optical element of any of Examples 1-8, where the metasurface includes a 1D, 2D, or 3D array of geometrically diverse features.

Example 10: The optical element of any of Examples 1-9, further including a reflective layer.

Example 11: The optical element of any of Examples 1-10, where the metasurface is configured as a waveguide input coupler or output coupler.

Example 12: The optical element of any of Examples 1-11, including a primary electrode overlying the substrate and a secondary electrode overlapping at least a portion of the primary electrode, where the organic solid crystal is disposed between the primary electrode and the secondary electrode.

Example 13: A device selected from an optical grating, lens, half waveplate, quarter waveplate, polarizing beam splitter, and reflective polarizer, where the device includes the optical element of any of Examples 1-12.

Example 14: A display includes a waveguide and a light input coupling element disposed on a surface of the waveguide, where the light input coupling element includes an organic solid crystal metasurface.

Example 15: The display of Example 14, where the metasurface is configured to interact with incident light and modify at least one of an amplitude, phase, or polarization of the light coupled into the waveguide.

Example 16: The display of any of Examples 14 and 15, where the metasurface includes a plurality of spaced apart nanoscale features.

Example 17: The display of Example 15, where a spacing of the nanoscale features varies across the surface of the waveguide.

Example 18: The display of any of Examples 16 and 17, where a pitch of the nanoscale features ranges from approximately 10 nanometers to approximately 1 micrometer.

Example 19: A method includes forming a metasurface including a plurality of spaced apart nanoscale features, where the metasurface includes a layer of an organic solid crystal.

Example 20: The method of Example 19, where forming the metasurface includes forming a layer of a nucleation-promoting material over at least a portion of a surface of a mol, and depositing a layer of molten feedstock over the surface of the mold and in contact with the layer of the nucleation-promoting material while maintaining a temperature gradient across the layer of the molten feedstock.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 800 in FIG. 8) or that visually immerses a user in an artificial reality (such as, e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 8:
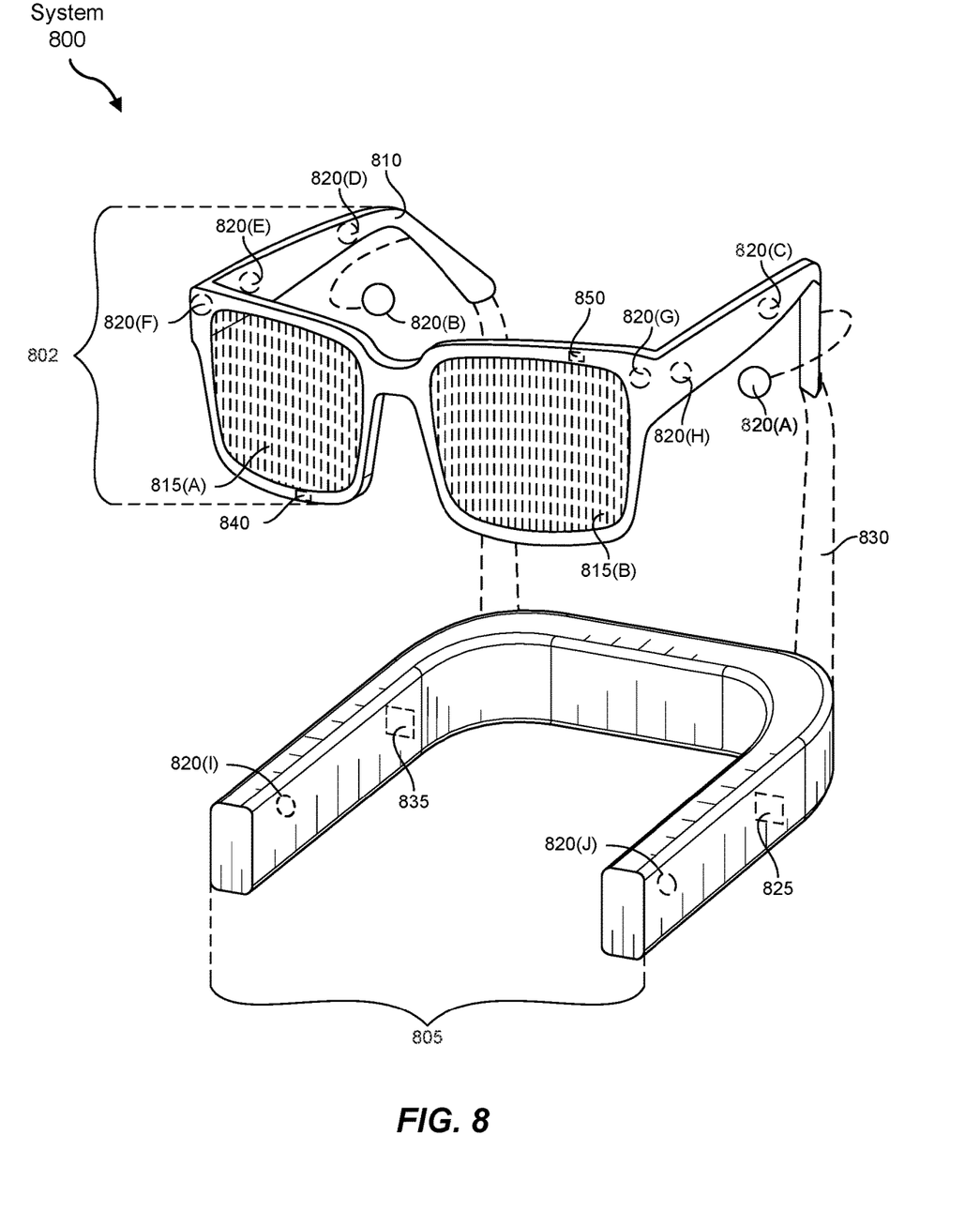
FIG. 8 is an illustration of exemplary augmented-reality glasses that may be used in connection with embodiments of this disclosure.

Turning to FIG. 8, augmented-reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. While augmented-reality system 800 includes two displays, embodiments of this disclosure may be implemented in augmented-reality systems with a single NED or more than two NEDs.

In some embodiments, augmented-reality system 800 may include one or more sensors, such as sensor 840. Sensor 840 may generate measurement signals in response to motion of augmented-reality system 800 and may be located on substantially any portion of frame 810. Sensor 840 may represent one or more of a variety of different sensing mechanisms, such as a position sensor, an inertial measurement unit (IMU), a depth camera assembly, a structured light emitter and/or detector, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

In some examples, augmented-reality system 800 may also include a microphone array with a plurality of acoustic transducers 820(A)-820(J), referred to collectively as acoustic transducers 820. Acoustic transducers 820 may represent transducers that detect air pressure variations induced by sound waves. Each acoustic transducer 820 may be configured to detect sound and convert the detected sound into an electronic format (e.g., an analog or digital format). The microphone array in FIG. 8 may include, for example, ten acoustic transducers: 820(A) and 820(B), which may be designed to be placed inside a corresponding ear of the user, acoustic transducers 820(C), 820(D), 820(E), 820(F), 820 (G), and 820(H), which may be positioned at various locations on frame 810, and/or acoustic transducers 820(I) and 820(J), which may be positioned on a corresponding neckband 805.

In some embodiments, one or more of acoustic transducers 820(A)-(J) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by an associated controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer 820, or some combination thereof.

Acoustic transducers 820(A) and 820(B) may be positioned on different parts of the user's ear, such as behind the pinna, behind the tragus, and/or within the auricle or fossa. Or, there may be additional acoustic transducers 820 on or surrounding the ear in addition to acoustic transducers 820 inside the ear canal. Having an acoustic transducer 820 positioned next to an ear canal of a user may enable the microphone array to collect information on how sounds arrive at the ear canal. By positioning at least two of acoustic transducers 820 on either side of a user's head (e.g., as binaural microphones), augmented-reality device 800 may simulate binaural hearing and capture a 3D stereo sound field around about a user's head. In some embodiments, acoustic transducers 820(A) and 820(B) may be connected to augmented-reality system 800 via a wired connection 830, and in other embodiments acoustic transducers 820(A) and 820(B) may be connected to augmented-reality system 800 via a wireless connection (e.g., a BLUETOOTH connection). In still other embodiments, acoustic transducers 820(A) and 820(B) may not be used at all in conjunction with augmented-reality system 800.

Acoustic transducers 820 on frame 810 may be positioned in a variety of different ways, including along the length of the temples, across the bridge, above or below display devices 815(A) and 815(B), or some combination thereof. Acoustic transducers 820 may also be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, hand-held controllers, tablet computers, laptop computers, other external compute devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband

805 may be located on one or more additional peripheral devices paired with eyewear device 802, neckband 805, or some combination thereof.

Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(I) and 820(J)) that are part of the microphone array (or potentially form their own microphone subarray). Neckband 805 may also include a controller 825 and a power source 835.

Acoustic transducers 820(I) and 820(J) of neckband 805 may be configured to detect sound and convert the detected sound into an electronic format (analog or digital). In the embodiment of FIG. 8, acoustic transducers 820(I) and 820(J) may be positioned on neckband 805, thereby increasing the distance between the neckband acoustic transducers 820(I) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820 (D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on neckband 805 and/or augmented-reality system 800. For example, controller 825 may process information from the microphone array that describes sounds detected by the microphone array. For each detected sound, controller 825 may perform a direction-of-arrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable to the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902 and a band 904 shaped to fit around a user's head. Virtual-reality system 900 may also include output audio transducers 906(A) and 906(B). Furthermore, while not shown in FIG. 9, front rigid body 902 may include one or more electronic elements, including one or more electronic displays, one or more inertial measurement units (IMUs), one or more tracking emitters or detectors, and/or any other suitable device or system for creating an artificial-reality experience.

Figure 9:
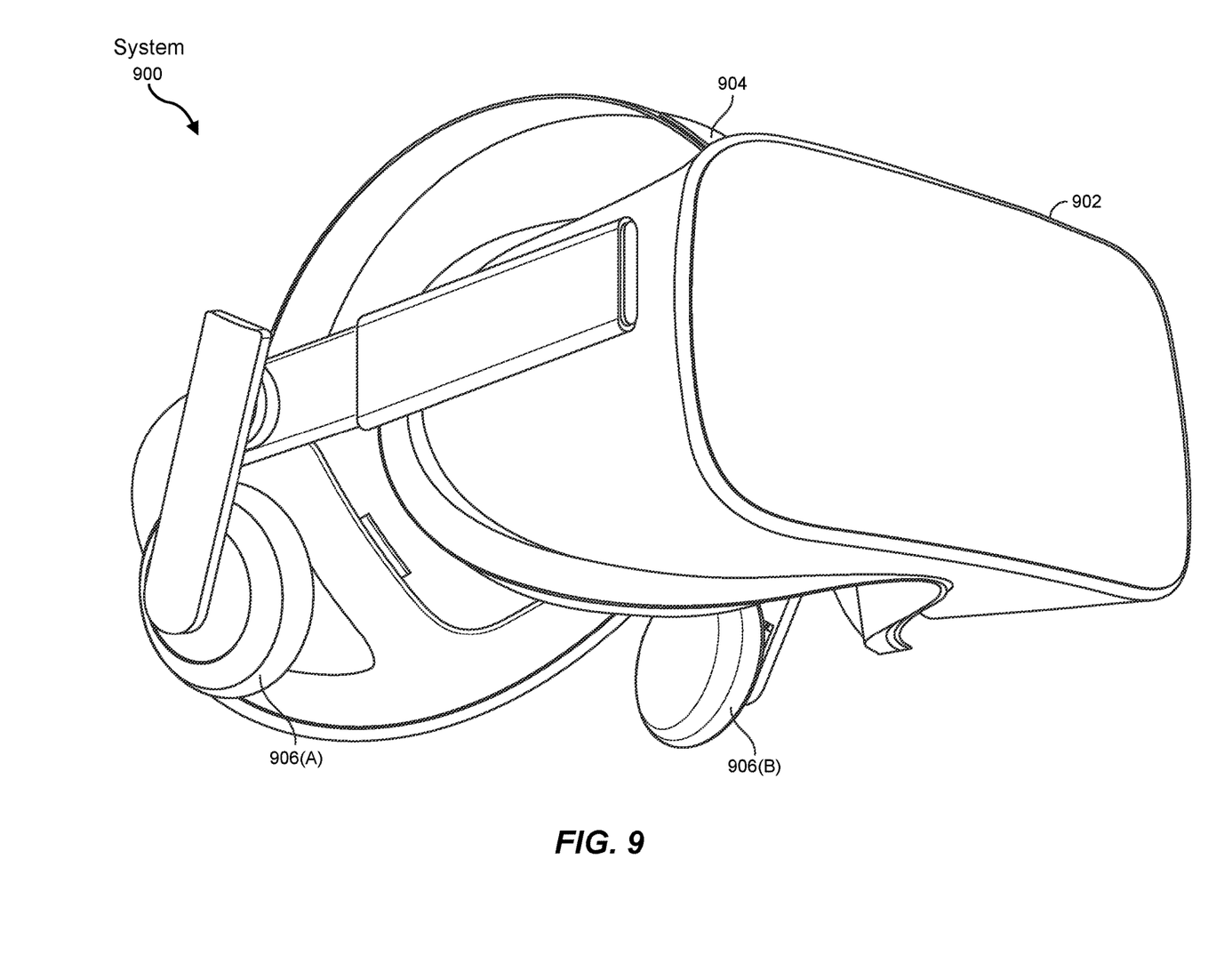
FIG. 9 is an illustration of an exemplary virtual-reality headset that may be used in connection with embodiments of this disclosure.

Artificial-reality systems may include a variety of types of visual feedback mechanisms. For example, display devices in augmented-reality system 800 and/or virtual-reality system 900 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 800 and/or virtual-reality system 900 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 800 and/or virtual-reality system 900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

As used herein, the term "approximately" in reference to a particular numeric value or range of values may, in certain embodiments, mean and include the stated value as well as all values within 10% of the stated value. Thus, by way of example, reference to the numeric value "50" as "approximately 50" may, in certain embodiments, include values equal to 50±5, i.e., values within the range 45 to 55.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

While various features, elements or steps of particular embodiments may be disclosed using the transitional phrase "comprising," it is to be understood that alternative embodiments, including those that may be described using the transitional phrases "consisting of" or "consisting essentially of," are implied. Thus, for example, implied alternative embodiments to an OSC layer that comprises or includes anthracene include embodiments where an OSC layer consists essentially of anthracene and embodiments where an OSC layer consists of anthracene.

What is claimed is:

1. An optical element comprising:
   a substrate;
   a primary electrode overlying the substrate;
   a secondary electrode overlapping at least a portion of the primary electrode; and
   a metasurface located over a surface of the substrate, wherein the metasurface comprises an organic solid crystal and the organic solid crystal is disposed between the primary electrode and the secondary electrode.

2. The optical element of claim 1, wherein the substrate comprises an organic solid crystal.

3. The optical element of claim 1, wherein the organic solid crystal comprises a moiety selected from the group consisting of saturated or unsaturated polycyclic hydrocarbons, benzene, naphthalene, anthracene, tetracene, pentacene, 2,6-naphthalene dicarboxylic acid, and 2,6-dimethyl carboxylic esters.

4. The optical element of claim 1, wherein the metasurface comprises features having a height dimension between approximately 1 nm and 1000 nm.

5. The optical element of claim 1, wherein the metasurface comprises features having a cross-sectional shape selected from the group consisting of square, rectangular, circular, oval, and asymmetric, and the cross-sectional shape has a lateral dimension between approximately 1 nm and 500 nm.

6. The optical element of claim 1, wherein the metasurface comprises features having a different shape and size.

7. The optical element of claim 1, wherein the metasurface is configured to interact with incident light and modify at least one of an amplitude, phase, or polarization of the light.

8. The optical element of claim 1, wherein the metasurface comprises a 1D, 2D, or 3D array of geometrically equivalent features arranged at a pitch of between approximately 10 nm and 1000 nm.

9. The optical element of claim 1, wherein the metasurface comprises a 1D, 2D, or 3D array of geometrically diverse features.

10. The optical element of claim 1, further comprising a reflective layer.

11. The optical element of claim 1, wherein the metasurface is configured as a waveguide input coupler or output coupler.

12. A device selected from the group consisting of an optical grating, lens, half waveplate, quarter waveplate, polarizing beam splitter, and reflective polarizer, wherein the device comprises the optical element of claim 1.

* * * * *